(12) United States Patent
Schulz et al.

(10) Patent No.: US 11,525,538 B2
(45) Date of Patent: Dec. 13, 2022

(54) QUICK-RELEASE JOHNSTON COUPLING

(71) Applicant: NEXANS, Courbevoie (FR)

(72) Inventors: Holger Schulz, Hannover (DE); Patrick Weber, Elze (DE)

(73) Assignee: NEXANS, Courbevoie (FR)

( * ) Notice: Subject to any disclaimer, the term of this patent is extended or adjusted under 35 U.S.C. 154(b) by 169 days.

(21) Appl. No.: 17/131,350

(22) Filed: Dec. 22, 2020

(65) Prior Publication Data

US 2021/0207759 A1    Jul. 8, 2021

(30) Foreign Application Priority Data

Dec. 26, 2019 (EP) ..................................... 19306774

(51) Int. Cl.
| | |
|---|---|
| *F16L 59/065* | (2006.01) |
| *F16L 39/00* | (2006.01) |
| *F16L 59/14* | (2006.01) |
| *F16L 59/18* | (2006.01) |

(52) U.S. Cl.
CPC ............ *F16L 59/065* (2013.01); *F16L 39/005* (2013.01); *F16L 59/141* (2013.01); *F16L 59/188* (2013.01)

(58) Field of Classification Search
CPC ..... F16L 59/065; F16L 59/141; F16L 59/188; F16L 39/005
USPC ........................................................ 138/149
See application file for complete search history.

(56) References Cited

U.S. PATENT DOCUMENTS

| | | | | |
|---|---|---|---|---|
| 3,207,533 | A | * | 9/1965 | Richards ............... F16L 39/005 |
| | | | | 285/31 |
| 4,108,476 | A | * | 8/1978 | Krupp ................... F16L 59/141 |
| | | | | 285/47 |
| 4,491,347 | A | * | 1/1985 | Gustafson ............. F16L 59/184 |
| | | | | 285/353 |
| 4,838,581 | A | * | 6/1989 | Oda ........................ F28F 21/04 |
| | | | | 285/422 |

(Continued)

FOREIGN PATENT DOCUMENTS

| | | |
|---|---|---|
| EP | 0 879 986 | 11/1998 |
| JP | H10 231970 | 9/1998 |
| WO | 2016/051770 | 4/2016 |

OTHER PUBLICATIONS

International Search Report dated May 8, 2020.

*Primary Examiner* — Craig M Schneider
*Assistant Examiner* — David R Deal
(74) *Attorney, Agent, or Firm* — Sofer & Haroun, LLP

(57) ABSTRACT

A plug-in coupling for connecting a first double-walled vacuum-insulated cryogenic line to a second. The plug-in coupling has a coupling plug and a coupling socket. The coupling plug can be plugged into the coupling socket, these being retained in a plugged-together state by fixing means. A guide column is arranged on the coupling plug or the coupling socket. The guide column has arranged on it elastic means which, in the assembled state of the plug-in coupling, are subjected to stressing and which subject the coupling plug and/or coupling socket to an elastic force which strives to release the coupling plug and coupling socket from one another as soon as the fixing means no longer hold the coupling plug and coupling socket together. The elastic energy stored in the elastic means ensures that, in the event of an emergency, the coupling plug and coupling socket are quickly released from one another.

13 Claims, 2 Drawing Sheets

(56) References Cited

U.S. PATENT DOCUMENTS

| | | | | |
|---|---|---|---|---|
| 5,868,437 | A | * | 2/1999 | Teague .................... F16L 9/147 285/911 |
| 6,079,446 | A | * | 6/2000 | Tocha ..................... F16L 59/18 62/50.7 |
| 6,533,334 | B1 | * | 3/2003 | Bonn ..................... F16L 59/141 285/904 |
| 8,517,749 | B2 | * | 8/2013 | Marshall ................ F16L 25/01 62/50.7 |
| 2008/0169037 | A1 | * | 7/2008 | Ziegler ................ F16L 59/188 285/47 |
| 2009/0050229 | A1 | * | 2/2009 | Kim ..................... F16L 59/143 138/149 |
| 2009/0145506 | A1 | * | 6/2009 | Queau .................. F16L 39/005 138/108 |
| 2010/0024911 | A1 | * | 2/2010 | Menardo ............... F16L 59/184 138/112 |
| 2019/0331268 | A1 | * | 10/2019 | Inomata .................. F16L 23/12 |

\* cited by examiner

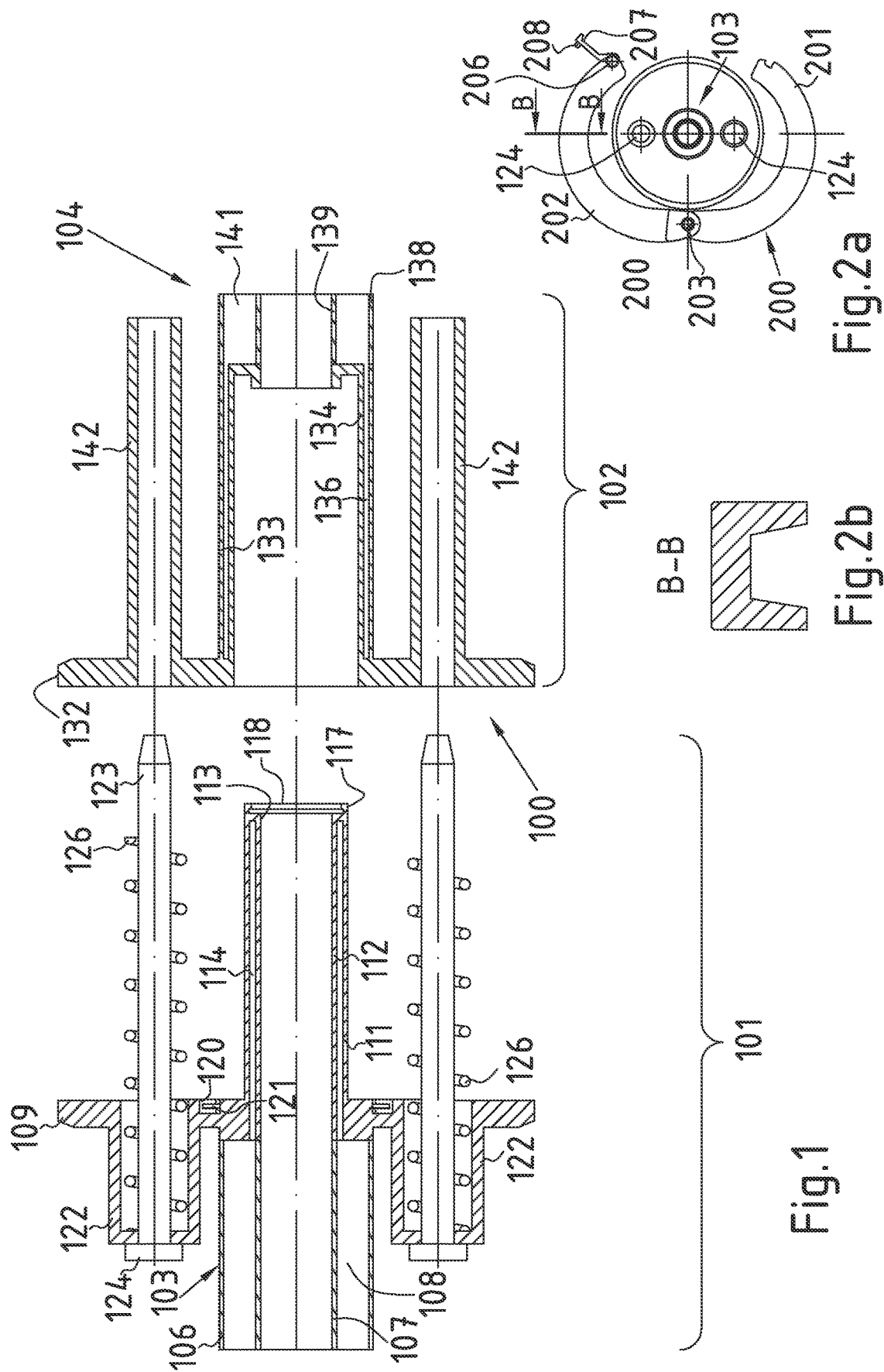

QUICK-RELEASE JOHNSTON COUPLING

RELATED APPLICATION

This application claims the benefit of priority to European Patent Application No. 19 306 774.1, filed on Dec. 26, 2019, the entirety of which is incorporated by reference.

FIELD

The invention relates to a plug-in coupling for flexible vacuum-insulated lines, this coupling also being referred to by the term "Johnston coupling". In particular, the invention relates to a quick-release Johnston coupling.

BACKGROUND

Extremely low-temperature media, which are also referred to as cryogenic fluids, are often transported on ships, in rail tankers or in road tankers. An important example here is liquefied natural gas (LNG), which has an evaporation temperature of −162° C. (111 K). Loading is typically carried out using non-insulated lines and couplings, which ice up during loading. The lack of thermal insulation results in some of the extremely low-temperature medium evaporating, which is accompanied by a loss of energy because the evaporated medium has to be liquefied again elsewhere with a high level of energy being required.

During the loading of even colder media, for example liquid hydrogen (evaporation temperature −253° C., 20 K) or liquid helium (evaporation temperature −269° C., 4 K), the oxygen in the ambient air would condense on the surface of non-insulated lines and couplings, the evaporation temperature of said oxygen being comparatively higher (−183° C.; 90 K). This is extremely undesirable, because liquid oxygen significantly increases a potential fire risk.

Furthermore, vacuum-insulated lines produced, for example, by Nexans are also known for the purpose of transporting such cryogenic fluids or media. For refuelling and loading purposes, the vacuum-insulated lines have a flexible design and are equipped at one end with a so-called Johnston coupling, by means of which two cryogenic lines can be connected without the thermal insulation being lost at the connecting location. This reduces the amount of icing up of the coupling location and losses of the cryogenic medium as a result of evaporation. A Johnston coupling is disclosed, for example, in EP 1 957 851 B1.

Put in simple terms, a Johnston coupling has two double-walled vacuum-insulated pipelines plugged one inside the other. The internal diameters of such pipelines are typically between 20 mm and 150 mm. In principle, however, smaller or larger internal diameters are also possible. The male part (inner double-walled pipeline) is plugged into the female part (outer double-walled pipeline). These are also referred to as a coupling plug and coupling socket. As a result, the outer surface is thermally insulated to very good effect in relation to the inner media-carrying pipe. For this purpose, the two double-walled pipelines have to be plugged one inside the other over a predetermined length. Depending on the medium and desired level of thermal insulation, typical pipe-in-pipe lengths range from 200 mm to 600 mm. Deviations towards shorter or longer lengths are possible in individual application cases.

So-called emergency-release couplings, which release and close a line when the latter is subjected to a certain level of tensile loading, are provided for straightforward lines, i.e. lines which are not vacuum-insulated, which are used for refuelling operations between ships and shore-side systems or land-based tankers and a refuelling system. If, for example, a ship drifts away from a quay wall or a tanker rolls away, then a refuelling line could rupture and possibly flammable medium could escape. This is prevented by the emergency-release coupling, which releases the line and closes the two line ends with the aid of non-return valves.

In contrast to conventional emergency-release couplings, the Johnston coupling has two vacuum-insulated coupling halves plugged one inside the other to a comparatively great extent, which can have a disadvantageous effect on quick release. Conventional emergency-release couplings are not suitable for vacuum-insulated lines or Johnston couplings.

Taking this as the departure point, it is the object of the present invention to create a plug-in coupling for vacuum-insulated cryogenic lines which has a connection which can be released quickly in the event of an emergency.

SUMMARY OF THE INVENTION

In order to achieve this object, the invention proposes, in accordance with a first aspect, a plug-in coupling for connecting a first double-walled vacuum-insulated cryogenic line to a second. The plug-in coupling comprises a coupling plug and a coupling socket. The coupling plug has an outer pipe piece and an inner pipe piece and also a first connection flange and is connected to the first cryogenic line. The coupling socket has an outer pipe piece and an inner pipe piece and also a second connection flange and is connected to the second cryogenic line. The coupling plug can be plugged into the coupling socket, these being retained in a plugged-together state by fixing means. A guide column is arranged on the coupling plug or the coupling socket. The guide column is accommodated in a guide cylinder or a guide means, which is arranged on the coupling socket, when the coupling plug has been plugged into the coupling socket. The guide column has arranged on it elastic means which, in the assembled state of the plug-in coupling, are subjected to stressing and which subject the coupling plug and/or coupling socket to an elastic force which strives to release the coupling plug and coupling socket from one another as soon as the fixing means no longer hold the coupling plug and coupling socket together.

The elastic energy stored in the elastic means ensures that, in the event of an emergency, the coupling plug and coupling socket are quickly released from one another. The guide column prevents the situation where, during the release operation, the coupling plug becomes skewed in the coupling socket and impedes, or even prevents, quick release.

An advantageous development of the plug-in coupling according to the invention involves a plurality of guide columns, which are each assigned an elastic means. A plurality of elastic means provides greater forces, which ensure quick release of the plug-in coupling. Moreover, a plurality of guide columns improve the guidance of the coupling plug and/or coupling socket, and this renders skewing even more unlikely.

The elastic means is advantageously designed in the form of a spring. It is particularly expedient if the spring is designed in the form of a helical spring, which is plugged onto a guide column. This arrangement has the advantage that it is possible to dispense with additional retaining means for the helical springs.

The guide columns are advantageously assigned mounts, which are dimensioned such that the compressed helical spring is accommodated therein. The compressed helical springs thus do not impede assembly of the plug-in coupling. In particular, the first and the second connection flanges rest tightly one on the other.

Each guide column can expediently be assigned a guide cylinder, in which the respectively associated guide column is accommodated when the coupling plug has been plugged into the coupling socket. The guide column and guide cylinder interact and ensure good guidance of the coupling plug and socket, in particular when the plug-in coupling is released in the event of an emergency.

In some application cases, it can be advantageous if the guide columns are arranged alternately on the coupling plug and on the coupling socket.

The fixing means can expediently be designed in the form of clamps. A clamp is simple in construction and can easily be fitted by an operator.

The clamps are particularly advantageously prestressed into an open position. As a result, the clamps disengage from the connection flanges of the plug-in coupling unless specific precautionary measures are taken to counteract this.

An expedient precautionary measure of this kind can be in the form of a locking hook, which retains the clamps in a closed state.

In the case of an advantageous exemplary embodiment, the locking hook can be disengaged by an actuating means, which connects for example the locking hook to a tanker. If the tanker moves away in an inadmissible manner from a refuelling station, then the locking hook is disengaged by the actuating means and the fixing means or clamps unfasten. Thereafter, the plug-in coupling is released by the compressed helical springs, which prevents a refuelling line from being subjected to inadmissible tensile forces.

It has proven advantageous in practice if actuating means are arranged on the clamps, said means making it easier for the clamps to be closed. For example, it is possible to provide a lever device, which makes it easier for an operator to close the clamps.

In accordance with a second aspect of the invention, the invention proposes a loading system for cryogenic fluids, having a plug-in coupling in accordance with the first aspect of the invention. The loading system realises all the advantages which have been described in conjunction with the plug-in coupling.

BRIEF DESCRIPTION OF THE DRAWING

The invention will be explained in more detail hereinbelow, by way of example, by way of two exemplary embodiments and with reference to the accompanying figures. All the figures are purely schematic and are not true to scale. In the figures:

FIG. 1 shows a schematic cross-sectional illustration of a plug-in coupling according to the invention;

FIG. 2a shows a plan view of the plug-in coupling from FIG. 1 with an open clamp;

FIG. 2b shows a cross section through the clamp from FIG. 2a;

Identical or similar elements are provided with identical or similar reference signs in the figures.

EXEMPLARY EMBODIMENT

Figure 3:
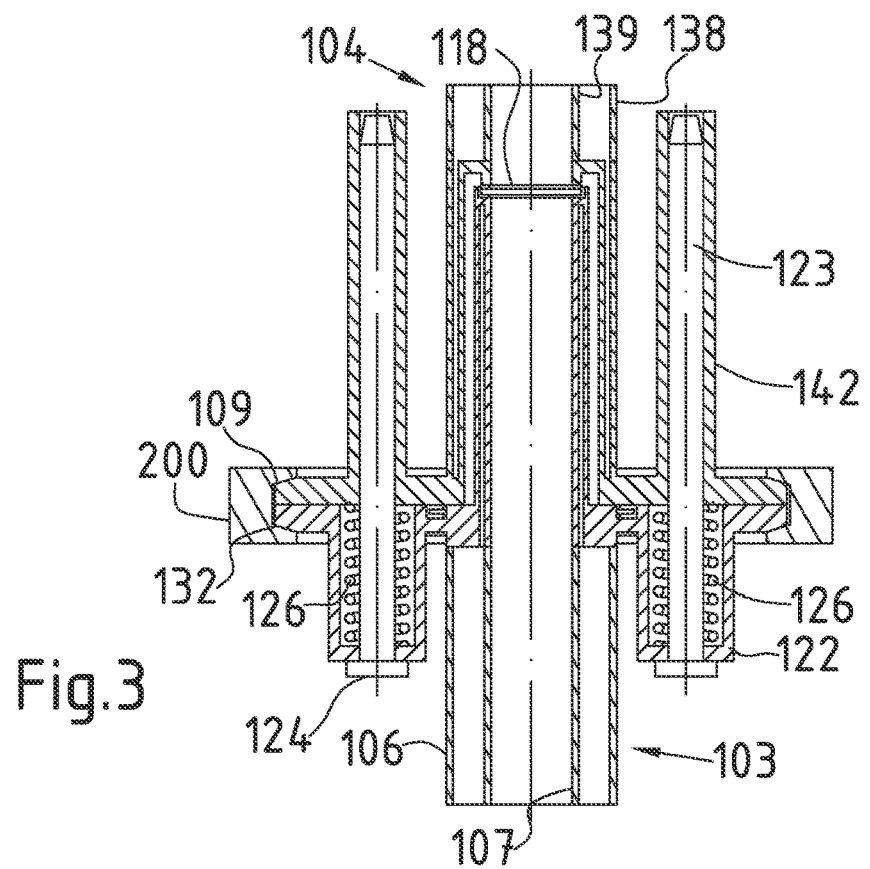
FIG. 3 shows the plug-in coupling from FIG. 1 in the assembled state.

FIG. 1 shows a plug-in coupling which is denoted as a whole by the reference sign 100. The plug-in coupling 100 comprises a coupling plug 101 and a coupling socket 102, which are illustrated in FIG. 1 prior to being assembled and at a small distance from one another.

The coupling plug 101 is connected to a first cryogenic line 103 and the coupling socket 102 is connected to a second cryogenic line 104. The first cryogenic line 103 has an outer pipe 106 and an inner pipe 107, which are separated from one another by an interspace 108 and are thermally insulated from one another by an insulating vacuum in the interspace 108. The cryogenic lines 103, 104 are double-walled vacuum-insulated cryogenic lines.

The coupling plug 101 comprises a first connection flange 109, an outer pipe piece 111 and an inner pipe piece 112. The outer pipe 106 of the first cryogenic line 103 is welded to a first main surface of the first connection flange 109. On the opposite main surface of the connection flange 109, the outer pipe piece 111 is welded to the first connection flange 109. A distal end 113 of the outer pipe piece 111, said distal end being remote from the first connection flange 109, is connected to the inner pipe piece 112, which extends in the direction of the first connection flange and is connected to the inner pipe 107 of the first cryogenic line 103. An annular gap 114 is formed between the outer pipe piece 111 and the inner pipe piece 112. The interspace 108 is flow-connected to the annular gap 114, and therefore the insulating vacuum extends into the annular gap 114 and ensures good thermal insulation of the inner pipe piece 112.

At the distal end 113, the outer pipe piece 111 is somewhat longer than the inner pipe piece 112 and forms a projecting periphery 117, which retains a circular-ring-form seal 118, which butts against the distal end 113. The seal 118 is produced, for example, from an electrically insulating material, for example from polytetrafluoroethylene (PTFE) or Torlon®. In other embodiments, the seal 118 is produced from an electrically conductive material. An annular groove 120 is introduced in the first connection flange 109 and has a seal 121 inserted into it. The seal 121 in the warm region of the plug-in coupling ensures that no evaporated medium escapes even if the seal 118 does not fully seal the plug-in coupling.

The first connection flange 109 contains two mounts 122 for two guide columns 123 or guide rods, which are fastened in the mount 122 by a screw 124. In principle, of course, other fastening methods are also conceivable, in particular welding. All that matters is that the guide columns 123 should be fixed to the first connection flange 109. Helical springs 126 are plugged on the guide columns 123. The mount 122 is dimensioned such that a fully compressed helical spring 126 is accommodated in the respective mount 122.

The coupling socket 102 has a second connection flange 132, an outer pipe piece 133 and an inner pipe piece 134. The pipe pieces 133, 134 each have one end welded to the second connection flange 132, wherein an annular gap 136 is formed, in turn, between the pipe pieces 133, 134. The respectively other ends of the pipe pieces 133, 134 are connected to the second cryogenic line 104. The second cryogenic line has an outer pipe 138 and an inner pipe 139. The outer pipe 138 and the inner pipe 139 have formed between them an interspace 141, in which prevails an insulating vacuum which thermally insulates the inner pipe 139. The outer pipe 138 of the second cryogenic line 104 is connected to the outer pipe piece 133, and the inner pipe 139 is connected to the inner pipe piece 134 of the coupling socket 102, and therefore the interspace 141 is flow-connected to the annular gap 136 and the insulating vacuum extends into the annular gap 136 of the coupling socket 102 and ensures good thermal insulation of the inner pipe piece 134 of the coupling socket 102.

It is also the case that guide cylinders 142 are provided in the second connection flange 132, it being possible for the guide columns 123 to be introduced into said guide cylinders with a small amount of play when the coupling plug 101 is plugged into the coupling socket 102. The ends of the guide columns 123 are chamfered in order to make it easier for the guide rods 123 to be introduced into the guide cylinders 142. The helical springs 126 rest on the surface of the second connection flange 132 and, as the coupling plug 101 is being plugged into the coupling socket 102, are compressed to an increasing extent until the first connection flange 109 butts against the second connection flange 132. In this state, the helical spring is in compressed form and is fully accommodated in the mount 122 (FIG. 3). The stressing of the helical springs 126 produces a force which drives the coupling plug 101 and coupling socket 102 apart from one another.

FIG. 2a shows a plan view in the axial direction of the coupling plug 101, the cryogenic line 103 being illustrated in cross section. FIG. 2a shows, in particular, a clamping ring 200, which has two clamps 201, 202. The clamps are connected to one another in a pivotable manner via a joint 203 and have a U-shaped cross section, wherein the opening of the U is oriented radially inwards and is dimensioned such that the clamps 201, 202 engage over the first and second connection flanges 109, 132 when the clamping ring 200 is closed. FIG. 2b shows a cross section of the clamp 202 taken along section line B-B in FIG. 2a.

Figure 4:
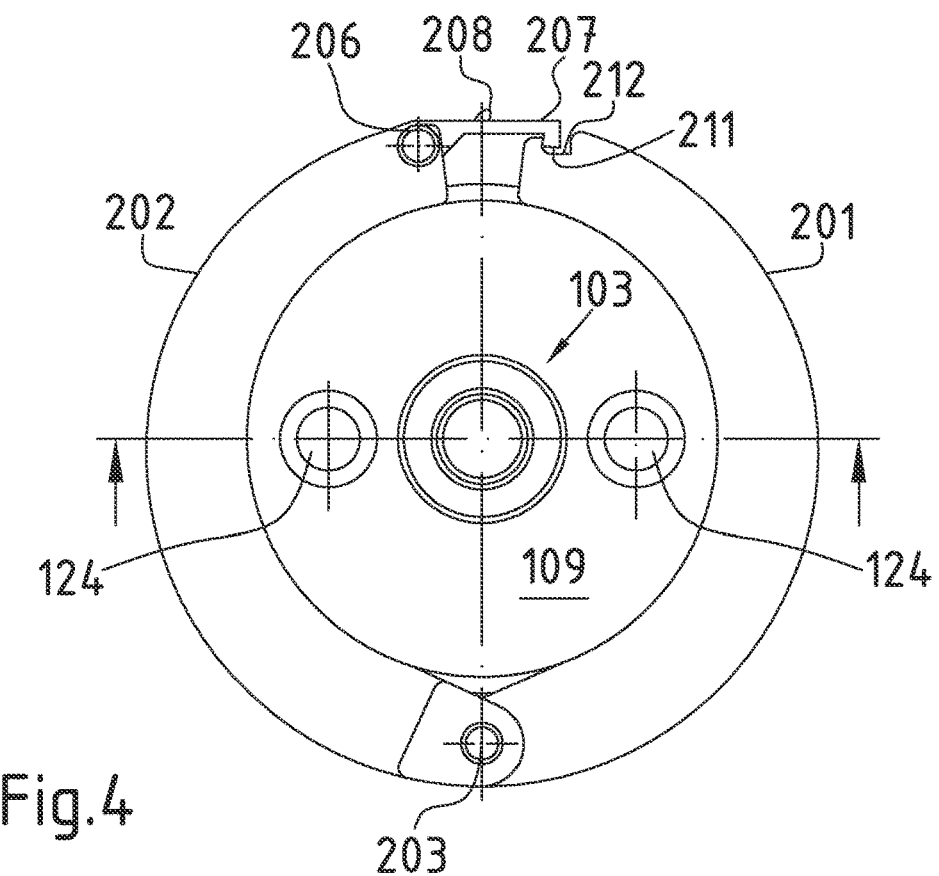
FIG. 4 shows a plan view of the plug-in coupling from FIG. 1 with a closed clamp.

FIG. 2a illustrates the clamping ring 200 in an open position. The clamping ring 202 also has a locking hook 207, which can be pivoted about a joint 206 and is designed to retain the clamping ring 200 in a closed position (FIG. 4). Also arranged on the locking hook 207 is a fastening point 208 for a disengagement means (not illustrated), the function of which will be described hereinbelow.

FIG. 3 shows the plug-in coupling 100 in a closed state, in which the coupling plug 101 has been plugged all the way into the coupling socket 102 to establish a sealed connection between the inner pipe 107 of the cryogenic line 103 and the inner pipe 139 of the cryogenic line 104. In the assembled state of the plug-in coupling 100, the helical springs 126 are in compressed form and are accommodated in the mounts 122 in the first connection flange 109. The guide columns 123 are accommodated in the guide cylinders 142. The first connection flange 109 and the second connection flange 132 are pushed against one another, and retained in this position, by the clamping ring 200. When the clamping ring 200 is disengaged, then the elastic forces exerted by the two helical springs 126 drive the coupling plug and socket apart from one another. At the same time, shut-off or non-return valves (not illustrated) in the cryogenic line 103, 104 are closed, and therefore only a small amount of medium, if any at all, escapes into the environment from the cryogenic lines 103, 104. To give a clearer picture, the shut-off valves have not been illustrated in FIGS. 1 and 3.

FIG. 4 shows a plan view in the axial direction of the coupling plug 101, the cryogenic line 103 being illustrated in cross section. The clamps 201, 202 engage over the outer peripheries of the connection flanges 109, 132 and press the connection flanges 109, 132 one onto the other. A protrusion 211 on the locking hooks 207 engages in a recess 212. The clamps 201, 202 are prestressed elastically, about the joint 203, in the direction of an open position, i.e. the clamps 201, 202 would pivot in relation to one another, and move apart from one another, about the joint 203 when the locking hook 207 is disengaged. This prestressed opening movement exerts a force on the protrusion 211 of the locking hook, which is retained in a closed position as a result of friction between the protrusion 211 and the depression 212. For this purpose, the abutment surfaces between the protrusion 211 and depression 212 run in the radial direction in relation to the centre of the first connection flange 109.

In a practical application case, a cable connects a tanker—be this a ship or a rail or road tanker—to the locking hook 207. For this purpose, the cable is fastened on the tanker and at the fastening point 208 of the locking hook 207. The length of the cable here is dimensioned such that the cable subjects the locking hook 207 merely to a negligible tensile force when the tanker moves within admissible limits. These admissible limits are defined by the maximum length of the cryogenic lines 103, 104. If the tanker moves beyond the aforementioned admissible limits, then the locking hook 207 is disengaged from the cable and the clamping ring 200 disengages from the connection flanges 109, 132 before the movement of the tanker subjects the cryogenic lines to an inadmissible tensile force. As soon as the clamping ring has disengaged from the connection flanges 109, 132, the compressed helical springs 126 drive the coupling plug 101 and the coupling socket 102 apart from one another. At the same time, the shut-off valves in the cryogenic lines 103, 104 close, and therefore it is not possible for any medium to escape into the environment.

As a result of the plug-in coupling proposed, the plug-in coupling is quickly and, in particular, fully released at a predefined point. The force which is necessary for quick release is applied by the compressed helical springs 126. The guide columns 123, which are guided in the guide cylinders 142, prevent the coupling plug 101 from becoming skewed in the coupling socket 102 and impeding, or even totally preventing, a quick and full release of the plug-in coupling.

In the case of further exemplary embodiments, it is also possible to provide more or fewer than two guide columns 123, guide cylinders 142 and helical springs 126.

In the case of large plug-in couplings, it can be expedient to use mechanical auxiliary means to overcome the force of the helical springs 126 and/or the spring force exerted on the clamps 201, 202. For this purpose, use can be made, for example, of lever devices to close the clamps.

| List of reference signs | |
|---|---|
| 100 | Plug-in coupling |
| 101 | Coupling plug |
| 102 | Coupling socket |
| 103 | First cryogenic line |
| 104 | Second cryogenic line |
| 106 | Outer pipe |
| 107 | Inner pipe |
| 108 | Interspace |
| 109 | First connection flange |
| 111 | Outer pipe piece |
| 112 | Inner pipe piece |
| 113 | Distal end |
| 114 | Annular gap |
| 116 | Insulating sleeve |
| 117 | Projecting periphery |
| 118 | Seal |
| 120 | Annular groove |
| 121 | Seal |
| 122 | Mount |
| 123 | Guide column |
| 124 | Screw |
| 126 | Helical spring |
| 132 | Second connection flange |
| 133 | Outer pipe piece |
| 134 | Inner pipe piece |

-continued

| List of reference signs | |
|---|---|
| 136 | Annular gap |
| 138 | Outer pipe |
| 139 | Inner pipe |
| 141 | Interspace |
| 200 | Clamping ring |
| 201, 202 | Clamp |
| 203 | Joint |
| 206 | Joint |
| 207 | Locking hook |
| 208 | Fastening point |
| 211 | Protrusion |
| 212 | Depression |

The invention claimed is:

1. A Plug-in coupling for connecting a first double-walled vacuum-insulated cryogenic line to a second, wherein the plug-in coupling comprises:
a coupling plug; and
a coupling socket,
wherein the coupling plug has an outer pipe piece and an inner pipe piece and also a first connection flange and is connected to the first cryogenic line,
wherein the coupling socket has an outer pipe piece and an inner pipe piece and also a second connection flange and is connected to the second cryogenic line,
wherein the coupling plug can be plugged into the coupling socket, these being retained in a plugged-together state by fixing means,
wherein a guide column is arranged on the coupling plug or on the coupling socket, said guide column being accommodated in a guide means on the coupling socket or on the coupling plug when the coupling plug has been plugged into the coupling socket, and in that the guide column has arranged on it elastic means which, in the assembled state of the plug-in coupling, are subjected to stressing and which subject the coupling plug and/or coupling socket to an elastic force which strives to release the coupling plug and coupling socket from one another.

2. The plug-in coupling according to claim 1, wherein the presence of a plurality of guide columns, which are each assigned an elastic means.

3. The plug-in coupling according to claim 2, wherein the guide columns are arranged alternately on the coupling plug and on the coupling socket.

4. The plug-in coupling according to claim 1, wherein the elastic means is a spring.

5. The plug-in coupling according to claim 4, wherein the spring is designed in the form of a helical spring, which is plugged onto a guide column.

6. The plug-in coupling according to claim 1, wherein each guide column is assigned a mount, which is dimensioned such that the compressed helical spring is accommodated therein.

7. The plug-in coupling according to claim 1, wherein each guide column is assigned a guide cylinder, in which the respectively associated guide column is accommodated when the coupling plug has been plugged into the coupling socket.

8. The plug-in coupling according to claim 1, wherein the fixing means are designed in the form of clamps.

9. The plug-in coupling according to claim 1, wherein the clamps are prestressed into an open position.

10. The plug-in coupling according to claim 1, wherein a locking hook retains the clamps in a closed state.

11. The plug-in coupling according to claim 10, wherein the locking hook can be disengaged by an actuating means.

12. The plug-in coupling according to claim 1, wherein actuating means are arranged on the clamps, said means making it easier for the clamps to be closed.

13. A loading system for cryogenic fluids, having a plug-in coupling according to claim 1.

* * * * *